Patented Oct. 6, 1953

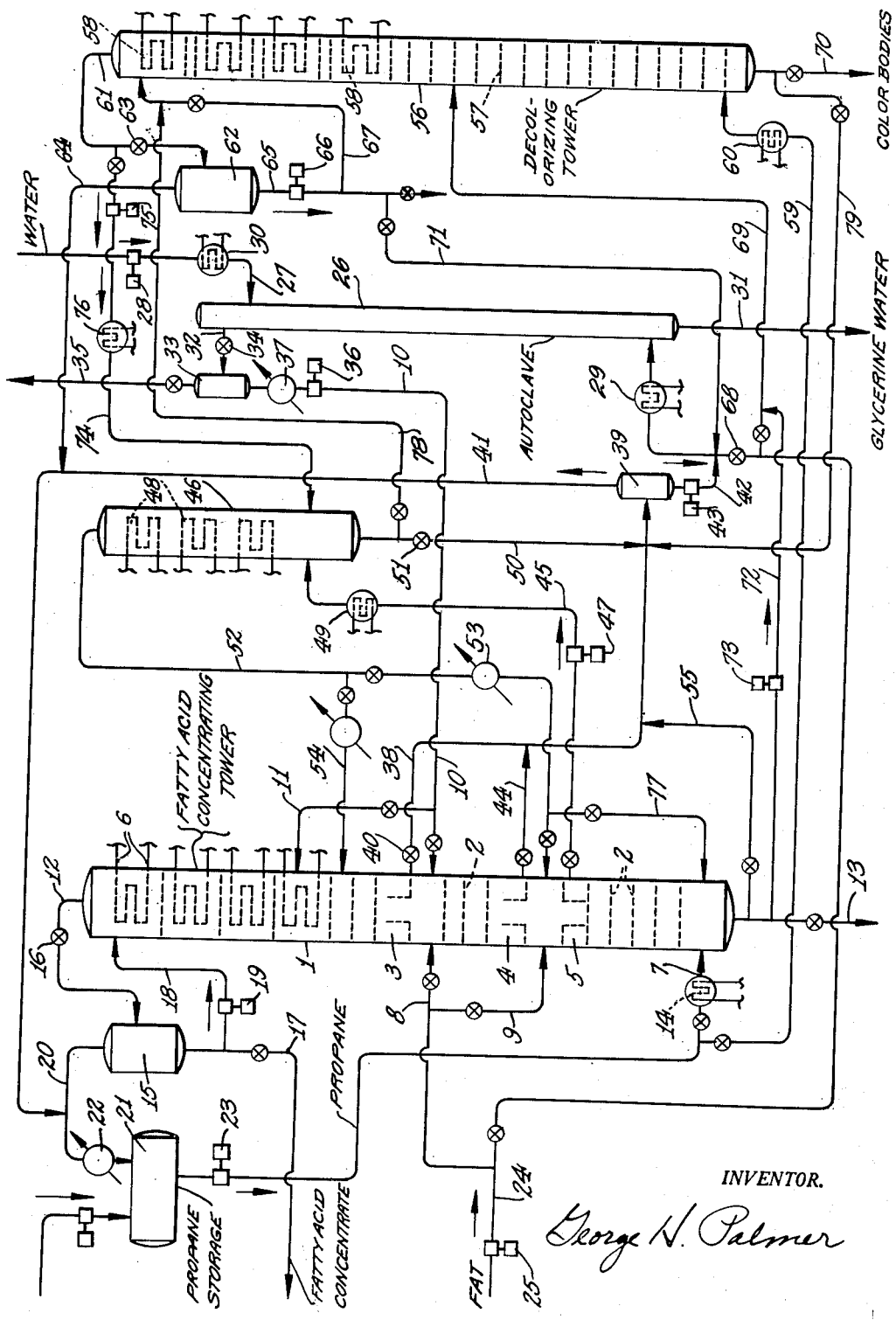

2,654,768

UNITED STATES PATENT OFFICE 2,654,768

PRODUCTION OF FATTY ACID CONCENTRATES

George H. Palmer, Fanwood, N. J., assignor to The M. W. Kellogg Company, Jersey City, N. J., a corporation of Delaware Continuation of application Serial No. 640,095, January 9, 1946. This application March 12, 1952, Serial No. 276,159

19 Claims. (Cl. 260—415)

This invention relates to an improved method for producing fatty acid concentrates. Still more particularly, the invention relates to an improved method for converting fats, containing glycerides to fatty acid concentrates. This application is a continuation of my application Serial No. 640,095, filed January 9, 1946, now abandoned.

The fats, including both normally liquid and normally solid fats, which are commercially available in large quantities, such as cotton seed oil, animal greases, cocoanut oil, linseed oil, soy bean oil, palm oil, fish oils, peanut oil, etc., consist principally of the glycerides of certain fatty acids, notably oleic, linoleic, palmitic, stearic, lauric, linolenic and myristic. These fats also may contain varying amounts of the fatty acids, as such, varying from the usual small percentage to fatty acid contents of 50 percent, or greater, which are encountered in certain cotton seed oil foots.

In the production of fatty acid concentrates it has been the custom heretofore to subject the fats, which may or may not already contain fatty acids, to hydrolysis treatment under conditions designed to produce as great a conversion of glycerides to fatty acids as is practicable. A secondary aim in such operations is the production of an aqueous glycerin solution of high concentration.

The hydrolysis treatment is carried out by reacting the fats with water. The rate of reaction is affected by temperature and pressure and is promoted by the use of catalysts, such as lime, magnesia and zinc, and the Twitchell reagent. The degree of hydrolysis of the fat which is achieved is affected also by the holding time of the oil in the reaction zone, the amount of water employed, and the glycerin content of the water in contact with the final glyceride-fatty acid mixture. In order to increase the degree of conversion of the fats to fatty acids and at the same time produce a glycerin solution of high concentration the countercurrent method of operation, described by Tilghman in his U. S. Patent 28,315, has been adopted.

The two principal methods which are employed may be designated as the autoclave method and the Twitchell method. In the former, the fat and water, and any catalyst employed, are heated under pressure for a time of contact of the fat with the water effective to produce the maximum practicable degree of conversion of glycerides to fatty acids. When using catalysts, temperatures as low as 285° F. may be employed.

Ordinarily, however, catalysts are dispensed with and the mixture of water and fat is heated to temperatures substantially higher than 390° F. When carrying out the autoclave method in batches, fatty acid concentrations of 85 to 90 percent, based on the total glycerides and fatty acids present, are achieved. The aqueous glycerin solution obtained in such batch operations contains about 12 to 15 percent glycerin. In continuous autoclave operations with countercurrent contact the conversion of glycerides to fatty acids may reach 99 percent, or higher, and the glycerin solution may have a concentration of 20 percent, or higher.

The Twitchell method is carried out at atmospheric pressure at about the boiling point of the water. The fat, water and Twitchell reagent are usually contacted in two stages. The fatty acid product of the first stage contains about 85 percent fatty acids, and the glycerin water from that stage has a concentration of about 12 percent. The fatty acid product from the first stage is then retreated with fresh water in a second operation to increase the fatty acid concentration, based on the total glyceride and fatty acid content of the oil, to about 95 percent. The glycerin solution from this second treatment is then reused in the first treatment with fresh fat.

The fatty acid concentrate thus produced may then be subjected to distillation and clay treatment to remove color bodies, and the glycerin product may be subjected to distillation to produce a glycerin concentrate product.

It is the principal object in carrying out the above described methods of hydrolyzing fats, to achieve the maximum practicable conversion of glycerides to fatty acids. The use of catalysts, reagents, high temperature, high pressure, and long holding time is resorted to for the purpose of achieving the highest practicable "split" of the glycerides to fatty acids whereby the product contains a high concentration of fatty acids. The maximum concentration of fatty acids which can be reached in the hydrolyzed product is effected by the degree of split achieved and also by the amount of the various "unsaponifiables" in the original fat. However, in designating the degree of conversion of glycerides to fatty acids, the presence of these unsaponifiables is usually ignored. Thus, a fatty acid concentrate containing 99 parts of fatty acids and 1 part of glyceride is said to represent a 99 percent split, regardless of the fact that the concentrate also may contain several parts of unsaponifiables. The degree of conversion of glycerides to fatty acids which it is practicable to reach in the various methods of hydrolysis is the basis on which such methods ordinarily are evaluated. In each process, furthermore, the necessity for reaching a high concentration of fatty acids in the product represents a large proportion of the expense of the operation. For example, the treatment of a fat to reach a 99 percent split may require apparatus double or quadruple the size of the apparatus necessary to effect a 90 percent conversion of the glyceride to fatty acid. Furthermore, the employment of high temperatures and high pressures and the use of special reagents and catalysts may be responsibe for the production of large amounts of undesired by-products, such as pitch and unsaturated compounds which react, when the fatty acid product is stored, to produce color bodies.

It is an object of this invention to provide a method for producing fatty acid concentrates containing substantially no glycerides, color bodies, or unsaturated materials capable of developing color on standing. It is a further object of the invention to provide a combined hydrolysis and concentrating method in which the extreme operating conditions previously necessary in the hydrolysis operation to reach a high degree of conversion are not necessary, but which produces nevertheless, fatty acid concentrates of the maximum degree of concentration. It is a still further object of the invention to provide a combined hydrolysis and concentrating method which produces a color-free fatty acid concentrate and a recycle stock for the hydrolysis step which is of light color. Other objects will be made apparent by the following detailed description of the invention.

In the detailed description of the improved process the solvent or concentrating agent employed will be designated as "propane." It is to be understood, however, that propane is merely a preferred solvent and that the invention includes the employment of other compounds of relatively low critical temperature which are inert under conditions of use and non-reactive under such conditions with the constituents of the fatty mixtures treated by such agents. These include low-boiling hydrocarbons other than propane, such as methane, ethane, the butanes, the pentanes, and the corresponding olefins, as well as mixtures thereof such as a mixture of methane and normal butane. Other agents include other organic compounds such as halogenated hydrocarbons, including dichlordifluor methane, dimethyl ether, and methyl fluoride. Still other agents, or solvents, which may be used are carbondioxide and ammonia. In general it may be said that inert and non-reactive compounds having critical temperatures not substantially higher than 450° F., and in which the fatty acid-glyceride mixture to be treated is at least partially soluble at temperatures below the critical temperature, may be employed satisfactorily. The preferred agents are those whose critical temperatures are lower than 325° F., such as normally gaseous compounds having the desired solvent power in the liquefied condition.

In the following detailed description of the invention reference will be made to percentages of fatty acids and glycerides in fats, and various degrees of hydrolysis, or "split," which are achieved in the treatment of fats or fatty mixtures. In all cases the percentages given are based on the content of saponifiable constituents, i. e., the total fatty acids and glycerides, in the mixtures. The unsaponifiable content of the mixture, which is usually small, is referred to only to show how its distribution in the products is affected by the process.

In its simplest embodiment the improved process involves, as an important step, subjecting a fatty acid mixture, in the presence of at least 10 percent of glycerides, to solvent fractionation with liquid propane at elevated temperature in a counter-current reflux-fractionation zone, as described below, to produce an extract phase substantially free from glycerides. It is found that the fatty acid product obtained by this method is substantially colorless and free from constituents capable of developing color bodies in the concentrate. Apparently the presence of a substantial proportion of glycerides in the fractionation zone permits the removal of color bodies from the fatty acid mixture to an extent which would not occur in the absence of the glycerides under otherwise similar conditions. If the amount of glycerides in the fatty mixture is less than 10 percent a similar result may be obtained by regulating the solvent fractionation treatment to produce a final raffinate phase containing at least 10 percent of the fatty mixture.

In its preferred embodiment the improved process involves a hydrolysis, or "fat-splitting," treatment of a glyceride-containing fat and the treatment of a fatty acid-glyceride mixture to produce a clear fatty acid concentrate. In this embodiment of the process the fat may be subjected to the solvent fractionation treatment before or after, or both before and after, the hydrolysis treatment, in various arrangements which will be described by reference to the accompanying drawing.

The accompanying drawing is a diagrammatic representation in elevation of an arrangement of apparatus adapted to carry out the improved process and the various modifications thereof, which will be described by reference to the drawing.

An important function in the improved process is performed in tower 1, which provides a zone for carrying out solvent fractionation of fatty mixtures with liquid propane in counter-current contact under refluxing conditions. The principal function of tower 1 is the production of a fatty acid concentrate as an overhead product, but this tower may be made to serve other functions in addition to, or instead of, fatty acid concentration. Tower 1 is an elongated vessel arranged vertically and constructed to withstand a sufficiently high internal pressure to maintain the propane in a liquefied condition under the highest temperature to be used in the treatment to be carried out in tower 1. Ordinarily, the highest pressure employed will be about 600 pounds per square inch, but necessarily this maximum will depend upon the boiling characteristics and the critical temperature of the specific solvent or concentrating agent employed.

Tower 1 also is provided preferably with suitable means for promoting intimate contact between the counter-flowing liquid phases. These means, which are indicated diagrammatically at 2, may be in the form of packing, baffles, or trays, or in any other suitable form. Tower 1 may also be provided with suitable trap-outs for collecting a part of one of the counter-flowing phases for separate withdrawal from tower 1 at an intermediate point. Trap-outs for withdrawing a part of the downflowing liquid phase are indicated at 3 and 4, and a trap-out for collecting and withdrawing part of the upflowing liquid phase is indicated at 5.

For reasons which will be described below, it may be necessary or desirable to heat the contents of tower 1 to maintain differentials in temperature between certain locations in the tower. This usually involves heating the upflowing liquid phase in the upper part of tower 1 to maintain a temperature differential or gradient between the top of the tower and the lower part of the tower. Such heating means are indicated diagrammatically by coils 6. It will be understood, however, that the location of the coils depends entirely upon the point or points in the tower at which it is desired to suply heat.

In the normal operation of tower 1, a stream of propane is introduced into tower 1 at a point near the bottom thereof, as through line 7, and a stream of oil to be fractionated is passed into the tower at an intermediate point, or at intermediate points, as through lines 8, 9, 10 and 11. As a result of the difference in gravity between the oil and the propane two counter-flowing streams are formed, the propane stream flowing upwardly toward an overhead draw-off line at 12, and the oil stream flowing downwardly toward a bottom draw-off at 13. While it is preferred ordinarily to employ the liquid propane in a volumetric ratio of propane to oil of at least 10:1, the temperature, pressure, and reflux conditions are regulated whereby the oil and the propane are only partially miscible, and form two phases. One phase contains all but a small portion of the propane and that portion of the oil which it is desired to extract in the propane. This phase constitutes the upwardly flowing propane stream in tower 1 and is designated as the propane phase, or as the upper phase, or as the extract phase. The other phase contains only a small proportion of the propane and a larger proportion of the oil in a propane:oil ratio much lower than that of the propane phase. This phase, which is substantially heavier than the propane phase and thus flows downwardly in the tower, is designated as the oil phase, or the bottom phase, or the raffinate phase.

The pressure maintained on tower 1 is selected primarily to maintain the contents of the tower in liquid condition and provide a sufficient margin over the minimum to permit slight adjustments of pressure during the operation. The maximum temperature to be employed in tower 1 will ordinarily not be higher than a few degrees above the critical temperature of the solvent or concentrating agent. For most operations the maximum temperature in tower 1 will be lower than such critical temperature. The critical temperature of the hydrocarbon propane is 206.3° F., whereas the critical pressure is 617.4 pounds per square inch. When using this hydrocarbon as the concentrating agent an operating pressure of 600–700 pounds per square inch is satisfactory.

The temperature in the top of tower 1, adjacent line 12, is maintained at the level necessary, in view of the propane-fat ratio employed, the degree of refluxing employed and, to a lesser extent, the pressure on tower 1, to dissolve in the propane phase withdrawn through line 12 only those ingredients of the fatty mixture desired in the overhead product of tower 1. In general it may be said that relatively high temperatures in the top of tower 1 are associated with relatively high propane-fat ratios and relatively low reflux ratios. When employing the hydrocarbon propane as the concentrating agent, the temperature which is found to be necessary in the top of tower 1 ordinarily will be 170 to 220° F.

The temperature in the bottom of tower 1 may be maintained at the same level as the top temperature. Ordinarily, however, efficient operation involves the maintenance of a substantial temperature gradient in tower 1, so that bottom temperatures somewhat below the top temperature are found to be desirable. The range of temperatures employed in the bottom of tower 1 is, therefore, approximately 160 to 220° F. The temperature differential between the top and bottom of tower 1 may vary from 1° F. to 60° F. In general, the range of operating temperatures is from a temperature a few degrees above the critical temperature of the concentrating agent to a temperature 100° F. below such critical temperature. This range of temperature is conveniently referred to as the paracritical range since it is the range of temperatures near the critical temperature. The relatively high temperature and pressure conditions in the tower which make possible precise fractionation herein described, are called paracritical conditions.

The top and bottom temperatures maintained in tower 1 must be correlated to permit withdrawal of the fats from the top and bottom of tower 1 in the desired ratio and at a combined rate of withdrawal equal to the charge rate. The bottom temperature is selected with the object of excluding from the lower phase withdrawn through line 13 as much as possible of the constituents of the fat which it is desired to include in the overhead product. However, the temperature in the bottom of tower 1 must be maintained above any temperature at which there occurs complete miscibility of the fat in the propane. A relatively low bottom temperature is employed in tower 1 when it is desired to withdraw as a bottoms product only a small proportion of the fat charged to tower 1. In general, relatively high bottom temperatures are associated with relatively high propane-fat ratios, and vice versa. The temperature in the bottom of tower 1 may be maintained conveniently at the desired level by control of the temperature to the propane stream passing into tower 1 from line 7. For this purpose, heating or cooling means 14 may be provided in line 7.

The efficiency of the operation carried out in tower 1 in concentrating fatty acids, and in achieving the other results desired in tower 1, is due to the intensive refluxing of the tower which is carried out at one or more points above the points of introduction of fat into tower 1. Such refluxing may be achieved by maintaining a substantially higher temperature in the top of the tower than at lower points in the tower by heating the contents of the top of the tower. The temperature range in which the tower is operated, extending from a few degrees above the critical temperature of the propane to a temperature 100° F. below that critical temperature, is one in which the miscibility of the fat with propane decreases with rising temperature. Consequently, the propane phase, which has become saturated with fat in the lower part of the tower at the temperature prevailing there, is heated in the top of the tower to a temperature at which it is unable to retain all the fat dissolved therein. As a result, the heating of the tower contents results in the precipitation of a part of the fat previously dissolved in the propane phase. The precipitated fat forms a separate, relatively heavy, liquid phase containing a small amount of propane in a ratio of propane to fat much lower than the corresponding ratio in the propane phase. This precipitated lower phase resembles physically the lower phase previously described as resulting from the insolubility of a part of the fat charged to the tower in the lower part of the tower.

The propane phase may be heated from the lowest temperature in the tower to the highest temperature at any one of the points occupied by the heating coils 6, whereby all the lower phase with which it is desired to reflux tower 1 is precipitated at one of these points. However, in order to avoid flooding tower 1 by release of a large quantity of precipitate at a single point, and in order to intensify the rectification of the propane phase, it is desirable to heat the propane phase to successively higher temperatures as it passes upwardly in contact with the series of heating coils 6. In this manner precipitation is induced along the length of the zone occupied by coils 6 in a substantially uniform manner and the application of the heat necessary to raise the temperature of the propane phase to the maximum temperature is simplified. In the drawing the heating elements 6 are indicated as located in the tower generally above the various points at which fat is to be charged to the tower for treatment. The operation is not necessarily limited to this arrangement, however, as heating elements may be provided below the fat charging point and, in fact, may be provided along the entire length of tower 1.

Tower 1 may be considered as divided into two zones. The upper zone, lying above the fat charging point, is the rectification zone, in which the operation of the tower is directed substantially entirely to achieving the desired degree of separation of the constituents of the fat charge. The lower zone, lying below the fat charging point, is primarily a stripping zone in which the portion of the fat which does not go into solution, but remains in the lower phase, and lower phase material precipitated in the rectification zone, are subjected to the stripping action of the upflowing stream of the propane phase to dissolve in the propane phase all constituents of the fat which it is desired to exclude from the bottom product.

Rectification also occurs in the stripping zone as an inherent part of the countercurrent stripping treatment and as a result of the passage into the stripping zone of the relatively more soluble lower phase material precipitated in the rectification zone. That portion of the lower phase material precipitated in the rectification zone which is not redissolved in its passage downwardly through the rectification zone combines with the portion of the fat charge which remains undissolved in the propane phase at the fat charge point to form a combined lower phase which flows downwardly through the stripping zone. As the propane introduced at the bottom of tower 1 in line 7 passes upwardly in the tower it absorbs more and more fat from the downflowing lower phase and reaches a concentration of fat which represents saturation of the propane phase at the existing temperature and pressure. Consequently, any additional quantities of fat dissolved by the propane in the stripping zone are balanced by corresponding precipitation of less soluble portions of the fat from the propane phase. Such precipitate passes into the downwardly flowing lower phase.

The rectification of the propane phase in the stripping zone is intensified if a temperature gradient is maintained in that zone. Whether or not the temperature gradient in tower 1 is maintained throughout the length of the tower depends somewhat on the extent of stripping which is made possible by the facilities provided. If a principal function of tower 1 is the recovery of the desired ingredients from the bottom phase, it may be desirable to maintain the stripping zone substantially uniformly at the lowest temperature in the tower, whereby the temperature of the propane phase at the fat charge point is substantially the same as the bottom temperature. Alternatively, a slight temperature gradient may be maintained between the propane charging point and the fat charging point while maintaining a greater temperature gradient between the fat charging point and the exit of the propane phase at line 11.

In the rectification zone the propane phase is subjected to treatment which continuously reduces the solvent power of the propane phase for the less soluble constituents of the fat during the passage of the propane phase upwardly through the rectification zone. This results in the precipitation of a lower phase which is heavier than the remaining propane phase and flows downwardly through the rectification zone as a separate lower phase. The linear velocity of the propane phase through the rectification zone is maintained sufficiently low to permit the downward flow of the lower phase. As each part of the lower phase flows downwardly in the rectification zone from the point at which it was precipitated, it comes into contact with a part of the stream of propane phase which is at a lower temperature. Furthermore, that part of the propane phase contains fat dissolved therein in excess of the equilibrium amount at that temperature and also contains an excessive quantity of the less soluble constituents of the fat in view of the composition of the lower phase with which it has come into contact. As a result of all these effects there is precipitation of fat from the propane phase at that point, and absorption of a part of the lower phase which has come down the tower to that point. Consequently, as the lower phase flows downwardly in the rectification zone it is subjected constantly to the stripping action of the propane phase, whereby the more soluble portions of the fat are re-dissolved. This is balanced, however, by constant accretions to the lower phase in the form of additional precipitate. This effect continues throughout the length of the rectification zone, whereby the fat in that part of the tower is subjected to continuous precipitation, resolution and reprecipitation. The final lower phase produced in the rectification zone flows out of that zone at the fat charging point and merges with the fat charge and forms a part of the lower phase flowing downwardly through the stripping zone. The stripping zone is so designated for the reason that the lower phase flowing therethrough contains the least soluble constituents of the fat. However, as has been pointed out above, rectification of the propane phase may occur also in the stripping zone.

Instead of, or in addition to, indirect heating of the tower contents, as by heating coils 6, other means may be provided to regulate the temperature of the propane phase. For example, a portion of the propane may be diverted from line 7, heated to a temperature above the bottom temperature, and introduced at an elevated point in the tower. The fat charged to the tower also may be preheated to assist in heating the propane phase. Furthermore, a portion of the propane may be premixed with the fat charge before admission of the latter to tower 1. This is particularly desirable if the fat is a solid or a highly viscous liquid.

In addition to the maintenance of a temperature gradient in the rectification zone to decrease the solvent power of the propane phase for the less soluble constituents of the fat in that zone, this effect can be achieved by changing the pressure or by preferentially dissolving in the propane phase portions of the fat which are more soluble therein than some of the fat previously dissolved in the propane phase. The methods involving control of the temperature and pressure may be employed independently, but each also involves the preferential resolution in the propane phase of portions of the fat which are more soluble therein than some of the fat previously dissolved when the lower phase formed by precipitation is flowed through the rectification zone in countercurrent contact with the propane phase. However, the establishment of a lower phase and rectification of the propane phase in the rectification zone can be effected without varying the temperature or pressure.

Rectification of tower 1 by varying the pressure is a less desirable method, as it requires dividing the rectification zone of tower 1 into a series of separate compartments. The propane phase would be passed through such separate compartments at progressively lower pressure to effect precipitation in each compartment. The precipitate in each compartment would be pumped into the next lower compartment and into contact with the propane phase therein. This method of operation is less desirable, as it requires more elaborate equipment and is less efficient.

Alternative to the maintenance of a temperature gradient, or in combination with that method, the solvent power of the propane phase for the less soluble constituents of the fat can be decreased by preferentially dissolving in the propane phase in the rectification zone portions of the fat which are more soluble than some of the fatty constituents which are already dissolved in the propane phase. This is accomplished conveniently by recovering the fatty component of the propane phase withdrawn through line 12 and returning part of it to the top of tower 1. This operation is designated as external refluxing to distinguish it from the internal refluxing of the rectification zone produced by the temperature gradient. In accordance with this method of operation the propane phase passes through line 12 to an overhead receiver 15. The pressure is reduced by the valve at 16 to permit all, or substantially all, of the propane to evaporate and thus separate from the fatty component. This operation may be assisted by heating means, not shown, in line 12 and in receiver 15. Alternatively, receiver 15 may be maintained at the tower pressure while evaporating the propane solely by the application of heat. In either operation it is not essential to evaporate the propane entirely and it is ordinarily more convenient to effect only a partial evaporation of the propane whereby some propane is left in the liquid phase in receiver 15. In the specific modification shown, all of the propane phase from tower 1 is shown as passing through line 12 to receiver 15. It is evident, however, that for purposes of refluxing it is essential only to pass to receiver 15 an amount of the propane phase which contains fatty constituents in the amount required for refluxing, the remainder of the propane phase being passed elsewhere for further treatment.

The liquid phase material remaining in receiver 15 after evaporation of all, or part, of the propane is withdrawn from receiver 15 through line 17. That part of this material desired for use as reflux is diverted from line 17 through line 18, which is provided with a pump 19 and connects with the upper part of tower 1. If desired, temperature control means may be provided in line 18 to insure returning the reflux liquid at the desired temperature.

The reflux liquid which is returned to tower 1 through line 18 is substantially more concentrated in fats than is the propane phase at the point of introduction of the reflux liquid. Since the propane phase at that point is substantially saturated with fats, the introduction of the reflux liquid causes a redistribution of the fat at that point. The most soluble portions of the refluxed fat are dissolved in the propane phase and there is a corresponding precipitation of the less soluble fatty constituents from the propane phase. The precipitated fat and the undissolved portion of the refluxed fat form a second liquid phase which then flows down the tower in countercurrent contact with the upwardly flowing propane phase. As the lower phase flows downwardly in the rectification zone there is a continuous redistribution of fat between the propane phase and the lower phase. At each point in the rectification zone the most soluble fatty constituents of the lower phase are dissolved in the propane phase, with a corresponding precipitation of less soluble fatty constituents in the propane phase. As the lower phase passes down the rectification zone it becomes more concentrated in the less soluble portions of the fat charge, and as the propane phase passes upwardly through the rectification zone the fatty portion thereof becomes increasingly concentrated in the most soluble constituents of the fat charge. At the fat charging point the lower phase flows downwardly from the rectification zone into the stripping zone and is merged with the undissolved fat charge.

The operating temperature limits described above in connection with the use of a temperature gradient for refluxing tower 1 generally are applicable to the method of operation involving external refluxing. When using external refluxing, however, it will be found that a somewhat lower top temperature is required in order to carry overhead in the propane phase the somewhat larger quantity of fat which is required to provide for reflux and an overhead product. When operating the tower with external refluxing the temperature in tower 1 may be uniform from top to bottom. It may be that the temperature which is arrived at under equilibrium conditions of operation is one which would cause excessive miscibility of the fat with the propane in the ratio in which these are charged to the tower. However, the tower is brought to equilibrium conditions by returning all the overhead product through line 18 until the quality of that product meets the requirement for the overhead product to be withdrawn. During that time the accumulation of refluxed fat in the propane phase in the tower lowers the solvent power of the propane phase for the fat charge to the point at which the propane phase has the desired selectivity as a solvent.

In any of the above methods of operation the ratio of propane to fat charged to tower 1 should be relatively high. A ratio of at least 10:1 is generally found necessary, and ratios as high as 100:1, or even higher, may be employed.

While the temperature gradient and external refluxing may be employed alternatively to accomplish rectification of the propane phase in tower 1, these methods desirably are combined in a single operation. Thus, a temperature gradient is maintained by heating coils 6 and at the same time tower 1 is refluxed through line 18. This combined method of operation is desirable as providing closer control of the operation of the tower.

In its simplest embodiment the improved process involves the step of introducing a fat containing both fatty acids and glycerides into tower 1 through line 8, while passing a propane stream into the bottom of tower 1 through line 7. As an example of this step, reference may be had to the treatment of a fatty acid-glyceride mixture which was substantially black in color and contained 41.2% free fatty acids (as oleic). This material also contained 1.46 unsaponifiables, had a saponification number of 196, an iodine number (Wijs) of 61, a specific gravity (60°/60°) of 0.912, and a titer of 38.9° C.

In this operation the final propane phase was withdrawn from the top of the fractionation zone and passed to a receiver, under reduced pressure, to separate propane and provide reflux liquid. A portion of the liquid phase in the receiver was returned as reflux to the fractionation zone at a point sufficiently spaced from the top of that zone to permit complete separation of the lower phase from the outgoing propane phase. A substantial temperature gradient was maintained between the fat charging point and the top of the fractionation zone. However, in this operation the rectification zone was considered to lie between the fat charging point and the refluxing point. A lesser temperature gradient was maintained in the stripping zone, i. e., between the fat charging point and the propane charging point. The fractionating zone was packed to effect intimate contact of the counter-flowing phases and was maintained under pressure effective to maintain liquid phase conditions. Three distinct operating conditions were employed. In the first operation a temperature gradient and refluxing were employed. In the second operation the reflux ratio was substantially increased, while in the third operation the increased reflux ratio was maintained, the propane-fat ratio was increased, and the length of the rectification zone was slightly decreased in favor of a longer stripping zone. The operating conditions and results obtained under these three sets of operating conditions are set forth in the following table:

|  | A | B | C |
|---|---|---|---|
| Operating Conditions: | | | |
| Temperature, °F.— | | | |
| Top | 210 | 209 | 212 |
| Fat Charging Point | 194 | 194 | 196 |
| Bottom | 189 | 189 | 192 |
| Gradient, °F./Ft.— | | | |
| Rectification Zone | 0.80 | 0.75 | 0.94 |
| Stripping Zone | 0.42 | 0.42 | 0.27 |
| Throughput, Lbs./Hr./Sq. Ft.— | | | |
| Fat | 172 | 170 | 175 |
| Propane | 2,860 | 2,860 | 4,760 |
| Propane Velocity, Ft./Hr | 91 | 91 | 152 |
| Propane Residence Time, Min | 23 | 23 | 14 |
| Propane: Fat Ratio (by Vol.—60° F. | 30.0 | 30.4 | 49.3 |
| Reflux Ratio (Fat Reflux: Fat Charge) | 1.47 | 2.68 | 2.80 |
| Rectification Zone, Ft | 20 | 20 | 17 |
| Stripping Zone, Ft | 12 | 12 | 15 |
| Pressure, Lbs./Sq. In. (Gauge)— | | | |
| Tower | 680 | 680 | 685 |
| Receiver | 460 | 460 | 470 |
| Yields and Balances: | | | |
| Wt. Percent Fat—Basis of Input (Output)— | | | |
| Recovered in Overhead Product | 40.3 (41.0) | 41.2 (40.9) | 39.5 (39.5) |
| Recovered in Bottoms Product | 58.2 (59.0) | 59.6 (59.1) | 60.6 (60.5) |
| Wt. Percent Fatty Acid—Basis of Input (Output)— | | | |
| Recovered in Overhead Product | 96.2 (96.1) | 97.7 (95.6) | 94.7 (97.0) |
| Recovered in Bottoms Product | 3.9 (3.9) | 4.5 (4.4) | 2.9 (3.0) |
| Wt. Percent Unsaponifiables—Basis of Input (Output)— | | | |
| Recovered in Overhead Product | 62.9 (56.6) | 64.6 (55.1) | 56.3 (53.1) |
| Recovered in Bottoms Product | 48.2 (43.4) | 52.7 (44.9) | 49.8 (46.9) |
| Quality of Products: | | | |
| Overhead— | | | |
| Color—Lovibond: | | | |
| Red | 1.5 | 1.5 | 1.5 |
| Yellow | 15 | 15 | 15 |
| Titer, °C | 38.8 | 38.8 | 39.0 |
| Free Fatty Acids, Percent (As Oleic) | 98.4 | 97.7 | 98.8 |
| Unsaponifiables, Wt. Percent | 2.28 | 2.29 | 2.08 |
| Glycerides | 0 | 0 | 0 |
| Iodine No. (Wijs) | 64 | 64 | 65 |
| Specific Gravity, 60°/60° | 0.889 | 0.889 | 0.889 |
| Saponification No | 198 | 196 | 196 |
| Bottoms— | | | |
| Free Fatty Acids, Percent (As Oleic) | 2.74 | 3.08 | 1.96 |
| Unsaponifiables, Wt. Percent | 1.21 | 1.29 | 1.20 |
| Saponification No | 191 | 192 | 191 |
| Iodine No. (Wijs) | 60 | 61 | 59 |
| Specific Gravity, 60°/60° | 0.919 | 0.922 | 0.921 |

Under condition A the fractionation zone was operated at a substantial temperature gradient, particularly in the rectification zone, and with external refluxing in the manner described above. The extent of external refluxing is defined in the foregoing table as the weight ratio of the quantity of fat returned as reflux to the fractionation zone to the quantity of fat charged to the fractionation zone. In condition B the operation was maintained substantially the same as in condition A, except that the reflux ratio was substantially increased. In condition C conditions were maintained generally the same as in condition B except that the propane-fat ratio was substantially increased. This required raising the tower temperature slightly, to offset the increased solvent power of the propane phase for fat. Conditions in all three periods were selected to produce a fat overhead product representing an approximate volumetric equivalent of the fatty acid content of the fat charge.

The results obtained in all three periods were substantially the same in that the overhead product contained approximately 98% free fatty acids and about 2% unsaponifiable fats. The increase in reflux ratio from condition A to condition B resulted in a slight decrease in the recovery of free fatty acids in the overhead, as shown by a slight increase in the concentration of the free fatty acids in the bottoms. However, this effect was more than offset in condition C by increasing the propane-fat ratio. In condition C the concentration of free fatty acids in the overhead was the highest obtained, and the concentration of fatty acids in the bottoms was correspondingly low. The unsaponifiable fats were slightly concentrated in the overhead to an extent which decreased as the conditions were changed to increase the degree of concentration and recovery of fatty acids in the overhead. The concentration of unsaponifiables in the overhead fraction decreased as the conditions were changed from A to B to C.

The recovery of fatty acids represented by the overhead product was in all cases 95%, or more, of the total fatty acids charged to the fractionation zone. It will be noted that the content of fatty acids in the overhead in each operation was approximately 100% of the total saponifiable content of that product. Thus, as a product of a fat splitting operation of the character described above, the product obtained in each of conditions A, B and C would represent a "100% split." When this fact is considered in connection with the unusually light color exhibited by the overhead product in all three operations, it will be apparent that the product in each case was of superior quality and represented a high recovery of the available fatty acids.

Referring again to the operation of tower 1, the propane separated in receiver 15 passes overhead through line 20, which connects with propane storage vessel 21. Cooling means are provided at 22 to effect condensation of the propane introduced into vessel 21. Line 7 connects vessel 21 with the bottom of tower 1 for return of liquid propane for reuse, a pump 23 being provided in line 7 for the purpose.

In accordance with a preferred modification of the improved process, the fat charged to the operation is introduced through line 24 by means of pump 25. Line 24 connects directly with an autoclave 26 which is provided for carrying out hydrolysis of the glyceride content of the fat charge introduced through line 24.

It will be understood that the hydrolysis step in the improved process may be carried out in accordance with any of the well known methods of hydrolysis, or in accordance with any other method. The method involving countercurrent contact of counterflowing streams of fat and water appears to be the most efficient method, and is chosen for illustration in the drawing of a fat splitting operation. It will be understood, however, that the invention is not limited to the particular method of hydrolysis illustrated in the drawing, but may include a hydrolysis step involving continuous contact of concurrent streams of fat and water, or contacting fat and water in batch operations which may involve several stages through which the fat and water pass concurrently, or countercurrently. Furthermore, the rate of hydrolysis may be accelerated by the employment of the various catalysts, and by the employment of the Twitchell reagent. It is a special advantage of the improved process that the selection of the particular method of hydrolysis employed may be made on the basis of efficiency and economy, rather than with respect to the maximum degree of hydrolysis which is attainable. The particular method of hydrolysis illustrated permits achieving a higher degree of hydrolysis than other available methods. It will be understood, however, that the use of this method in the present invention does not require conditions of hydrolysis which achieve the maximum possible conversion of glycerides to fatty acids. The conditions of operations preferably are selected entirely with reference to efficiency and economy, and the production of a fatty acid product of the desired concentration of fatty acids is left to the propane fractionation step. This permits carrying out the hydrolysis step under conditions which are less drastic, as to temperature and pressure, residence time, and the requirement for catalysis.

Autoclave 26 preferably is an elongated, vertically arranged, tower, constructed to withstand the relatively high pressure necessary to carry out the hydrolysis treatment at a high rate of reaction. If desired, suitable trays or other contact means may be provided to assist in promoting intimate contact of the counter-flowing phases. In autoclave 26, the fat passes upwardly as a stream in countercurrent contact with a downwardly flowing stream of water. The water is introduced at a point near the top of autoclave 26 through line 27 by means of pump 28. Heating means 29 and 30 are provided in lines 24 and 27 respectively, to permit preheating the water and fat to the necessary degree. These components can be preheated to the maximum temperature desired in the autoclave, or they may be introduced at a lower temperature and permitted to reach the maximum temperature through their contact with the oppositely flowing phase. Autoclave 26 may be provided with internal or external means for heating the contents, either continuously during the treatment or in a preliminary way, to heat the contents of the autoclave initially to the desired reaction temperature. The heat of hydrolysis may be sufficient to provide all the heat necessary to preheat the water and fat to the maximum reaction temperature.

If no catalysts or other reagents are employed to accelerate the reaction, temperatures in excess of 390° F. ordinarily are employed. To achieve a high degree of conversion of the glycerides to fatty acids, temperatures within the range of 365 to 600° F. ordinarily are employed. An upper limit on the permissible temperature is imposed by the tendency of the fat and water to form completely miscible mixtures at temperature levels which vary with the character of the fat. Necessarily, the temperature must be maintained below such levels to retain the two separate phases which are necessary to contact the oil and fat as counter-flowing streams. The pressure imposed on autoclave 26 necessarily must be sufficiently high to maintain liquid phase conditions and should be maintained substantially higher than the vapor pressure of water at the operating temperature in order to dissolve a sufficient quantity of the water in the fat. Apparently the hydrolysis reaction proceeds by reaction of fat with water dissolved therein. Ordinarily, pressures as high as 250 pounds per square inch above the vapor pressure of water at the operating temperature may be employed.

The amount of water employed in relation to the fat must be such as to provide the water consumed in the hydrolysis reaction, an excess over that amount necessary to promote the reaction, and a still further excess necessary to provide a vehicle for the glycerin which is formed by the hydrolysis reaction. The extent of conversion of the glycerides is governed somewhat by the concentration of the glycerin-water solution in contact with the fat. Ordinarily, the operation of a countercurrent hydrolysis treatment involves the selection of a water-fat ratio which facilitates the desired rate of reaction while permitting the formation of a final glycerin-water solution of relatively high concentration. In accordance with the improved process it may be desirable to reduce the water-fat ratio below that normally considered desirable for maximum conversion of glycerides, in order to produce a glycerin-water solution of still greater concentration.

The glycerin-water solution collects in the bottom of autoclave 26 and is withdrawn therefrom through line 31. This product is subjected to further purification and concentration treatment by methods known to those skilled in the art.

The hydrolyzed fat collects in the top of autoclave 26 and is withdrawn therefrom through line 32, which connects with an expansion drum 33. Pressure is reduced, by means of valve 34, to permit evaporation of water dissolved in the fat at the higher pressure. The steam and other gases are withdrawn from drum 33 through line 35. The hydrolyzed fat collects in the bottom of drum 33 and is withdrawn therefrom through line 10. If necessary, the hydrolyzed fat in line 10 may be subjected to further treatment to remove any water which is not evaporated by the reduction in pressure. Ordinarily, however, this is not necessary and the hydrolyzed fat may be passed directly through line 10 to an intermediate point of tower 1 for fractionation there in the manner described. If necessary, a pump 36 is provided in line 10 and cooling means 37 are provided to bring the hydrolyzed fat to the temperature at which it is to be introduced into tower 1.

The residence time which is permitted the fat in autoclave 26 is governed somewhat by the extent of hydrolysis, or degree of split, desired in the hydrolyzed fat. In order to obtain substantially complete conversion of the glycerides to fatty acids, whereby not more than a few percent of the glycerides remain unreacted, it is necessary to provide an autoclave of sufficient volume to retain the fat for a residence time as long as several hours. It has been pointed out, however, that a principal advantage of the improved process resides in the fact that it permits operation of the autoclave under conditions which effect a degree of split which previously would have been considered unacceptable. A degree of split which is acceptable in the improved process may be achieved, under favorable conditions, in a small fraction of the time necessary for substantially complete conversion of the glycerides. In accordance with the improved process the hydrolysis treatment is regulated, principally as to residence time, to restrict the split to less 90 percent, whereby the hydrolyzed fat contains not less than 10 percent of glycerides. Preferably, the conditions are regulated, as by the reduction of both residence time and temperature, to restrict conversion of glycerides to less than 75 percent, whereby the hydrolyzed fat contains at least 25 percent of glycerides. The improved process includes within its scope, operations in which the hydrolysis treatment is controlled to produce a split of 50 percent or less, whereby the temperature, pressure and residence time can be reduced well below the figures previously considered necessary for this operation. Operation of the autoclave to produce these relatively low splits of the fat is particularly advantageous in the treatment of fats which, at relatively high temperatures and pressures, produce fatty acid products which are not color-stable and tend to darken on standing.

As a part of the preferred method of operation of the improved process, the hydrolyzed fat is fractionated to separate an overhead product substantially free from glycerides and to produce a bottoms, or intermediate, product containing the unsplit glycerides. In accordance with this method of operation the glyceride-fatty acid mixture introduced into tower 1 through line 10, or through line 11, is subjected to propane fractionation under refluxing conditions as described above, to produce the fatty acid concentrate which is taken overhead and withdrawn from the system through line 17. This operation of tower 1 concentrates in the lower phase any color bodies which may have been present in the original fat charged to the system, or which are formed during the hydrolysis treatment. It is a desirable feature of the process to eliminate such color bodies from the system by withdrawing from tower 1 a relatively small bottoms fraction through line 13, which is eliminated from the system. At the same time, a part of the lower phase formed is collected for withdrawal from tower 1 at one or more intermediate points.

The color bodies are found principally in the lower phase below the fat charging point in tower 1. For that reason it is desirable, if possible, to withdraw the intermediate fraction containing the unsplit glycerides from a point above the fat charging point. For that purpose, trap-out 3 is provided, just above the connection of lines 8 and 10 with tower 1. The lower phase material collected on trap-out 3 is withdrawn at that point from tower 1 through line 38, which connects with an expansion drum 39. The pressure on the lower phase material withdrawn through line 38 is reduced by means of valve 40 sufficiently to permit evaporation, and separation, in drum 39, of the propane contained in this lower phase material. The propane thus released passes upwardly out of drum 39 through line 41, which connects with line 20, whereby the propane is recycled for further use in the manner described.

The liquid phase material in drum 39, consisting of a relatively clean fatty mixture comprising the unsplit glycerides collects in the bottom of 39 and is withdrawn therefrom through line 42 by means of pump 43, which connects with line 24, whereby the fatty mixture withdrawn from tower 1 through line 38 is passed through line 24 to autoclave 26, either alone or in combination with other fat flowing through line 24. It may be desirable to subject the liquid phase material collected in drum 39 to further treatment, such as vacuum treatment and steam distillation, to remove residual quantities of propane which are retained therein at the pressure on drum 39. However, for simplicity of presentation, the means for such additional treatment are omitted from the drawing.

If the concentration of glycerides in the lower phase material on trap-out 3 is not as high as desired for charging to autoclave 26, it may be desirable to go further down the tower for the intermediate fraction to be withdrawn. For that purpose trap-out 4 is provided some distance below lines 8 and 10. Material collected on trap-out 4 is withdrawn through line 44. Line 44 connects with line 38 whereby the lower phase material from trap-out 4 is passed to drum 39 for treatment in the manner described above.

The intermediate fraction collected on trap-out 4 contains more of the color bodies than does the material on trap-out 3 but will be somewhat lighter than the bottom fraction withdrawn through line 13.

According to an alternative method, a portion of the upper phase may be withdrawn from tower 1, treated to separate fat contained therein, and then, if desired, returned to the tower. For this purpose trap-out 5 may be provided to collect upper phase material free from lower phase material. The propane phase thus collected is withdrawn from tower 1 through line 45, which connects with a separate precipitating drum 46. Drum 46 advantageously is maintained at a higher pressure than tower 1, and for this purpose a pump 47 is provided in line 45. In drum 46 the propane phase is heated to a relatively high temperature to effect precipitation of a lower phase containing a fatty component relatively concentrated in glycerides. For this purpose heating elements 48 may be provided in vessel 46 and, if desired, additional heating means 49 may be provided in line 45. The temperature in vessel 46 may be carried sufficiently high to precipitate substantially all the fat in the lower phase. However, partial precipitation is sufficient to provide reflux. In order to accomplish some rectification of the phases in vessel 46, the latter advantageously is elongated and vertically arranged, with heating elements 48 spaced along its length. In this manner a temperature gradient is imposed on the propane phase flowing upwardly through vessel 46 to effect greater concentration of the glycerides in the lower phase. The lower phase material collects in the bottom of vessel 46 and is withdrawn therefrom through line 50, which is provided with a pressure release valve 51. Line 50 connects with line 38 whereby the lower phase material from vessel 46 passes to expansion drum 39 for further treatment in the manner described above.

The propane phase remaining in vessel 46 passes out of the top of that vessel through line 52, which connects preferably with tower 1 at a point just above the point of withdrawal through line 45. Cooling means 53 may be provided in line 52 to precool the propane phase to the desired temperature. It may be desired to introduce all, or part, of this propane phase at an elevated point in tower 1, and for that purpose line 54 is provided to connect line 52 with tower 1 at an elevated point, as shown.

Alternatively, the glyceride concentrate for recycling to autoclave 26 may be obtained as bottoms product in tower 1. For this purpose line 55 is provided to connect line 13 with line 38 whereby the lower phase material collected in the bottom of tower 1 may be transferred to vessel 39 for further handling in the manner described above. If the lower phase material in the bottom of tower 1 contains a large amount of color bodies it may be desirable to withdraw a small proportion of lower phase material from the system through line 13, while recycling the greater proportion into line 55. The withdrawal of such small amount of the lower phase material may be desirable in any case to prevent the accumulation of pitch-like materials formed during the hydrolysis treatment.

The operation of tower 1 has been described in detail in connection with the use of the tower in the concentration of a fatty acid product from autoclave 26. It will be understood, however, that tower 1 also may be employed for the preliminary treatment of a fat to separate therefrom a suitable charging stock for autoclave 26. Such preliminary treatment is especially desirable when the fat charge introduced through line 24 already contains a substantial proportion of fatty acid or when such fat charge contains a large proportion of color bodies or other compounds which it is desired to exclude from autoclave 26.

Conveniently tower 1 may be employed both for the preliminary treatment of the fat charge and the concentration of the product from autoclave 26. In accordance with this method of operation the fat charge passing through line 24 is diverted therefrom, wholly or in part, through line 8 for introduction directly into tower 1. The charge for autoclave 26 is withdrawn from tower 1 through line 38 or line 44 or line 45 or line 55. This material is separated from accompanying propane at 39 in the manner described and then passed to autoclave 26 through lines 42 and 24, along with any remainder of the fat charge introduced through line 24 and not diverted therefrom through line 8. In this method of operation tower 1 is operated under conditions effective to separate overhead a fatty acid concentrate substantially free from glycerides. The glyceride concentrate for charging to autoclave 26 may be recovered from the lower phase material in the bottom of tower 1. It is desirable, however, to withdraw only a small bottoms product through line 13 to eliminate color bodies and pitch-like material, while recovering the charging stock for autoclave 26 as a side stream at 3, 4 or 5.

While the fat charge and the hydrolysis product may be introduced into tower 1 at the same level through lines 8 and 10 it may be desirable to introduce these materials into tower 1 at different levels. For example, if the fat charge in line 8 contains a high proportion of color bodies it may be desirable to introduce this material at a relatively low point in tower 1, as by diverting it from line 8 through line 9. Also, if the hydrolysis product is substantially more concentrated in fatty acids than the fat charge in line 8 it may be desirable to introduce such hydrolysis product into tower 1 at an elevated point, as by diverting it from line 10 through line 11.

Instead of treating both the fat charge and the hydrolysis product in tower 1 it may be desirable to provide a second fractionating tower. Thus tower 56, generally similar in construction and operation to tower 1, may be provided. Tower 56 if provided with suitable contact means, indicated diagrammatically at 57, and with heating coils 58 for imposing a temperature gradient on the tower. The propane stream for tower 57 is introduced from line 59, which connects with line 7, and is provided with a heating element 60. The final propane phase passes overhead from tower 56 through line 61 which connects with an overhead receiver 62. By means of a valve 63 in line 61 the pressure on the propane phase is reduced sufficiently to separate all, or most, of the propane by evaporation. The vaporized propane separates from the remaining liquid phase in receiver 62 in the manner described in connection with the operation of receiver 15. The vaporized propane passes overhead from receiver 62 through line 64 which connects with line 41, whereby the propane is returned to propane storage at 21. The remaining liquid phase which contains the overhead fatty product of tower 56 and also may contain some propane is withdrawn from receiver 62 through line 65 by means of pump 66. A portion of the liquid phase material passing through line 65 may be diverted therefrom through line 67 which connects with the upper part of tower 56 whereby a part of the liquid phase material separated in receiver 62 may be returned as reflux liquid to tower 56. The reflux liquid thus returned to tower 56 functions in exactly the manner described in connection with tower 1.

In accordance with one method of operation employing both tower 1 and tower 56 the fat charge to the system is passed directly to tower 56. For this purpose a valve 68 is provided in line 24 and line 69 is provided to connect line 24 with an intermediate point in tower 56. The function of tower 56 in this combination ordinarily is the elimination from the system of a small lower phase fraction containing the color bodies of the fat charge. For this purpose it is sufficient ordinarily to withdraw from the bottom of tower 56 through line 70 a quantity of the lower phase material containing not more than 5 to 10 percent of the fat charge introduced into tower 56 through line 69. To achieve this purpose, relatively low tower temperatures are employed and the propane phase is subjected to extensive rectification, by means of external refluxing through line 67 and the maintenance of a substantial temperature gradient, in order to eliminate color bodies from the final propane phase.

The overhead product of this operation of tower 56 is withdrawn from line 65 by means of line 71. Line 71 connects with line 24 at a point on the other side of valve 68 from line 69, whereby the liquid phase material from receiver 62 passes into the bottom of autoclave 26 for hydrolysis treatment therein in the manner described. This treatment will consist primarily of liquid phase material will include any fatty acids contained in the fat charge, as well as a part of any unsaponifiables contained therein. It may be desirable to subject the liquid phase material in line 71 to further treatment, such as vacuum treatment and steam distillation, to remove residual quantities of propane which are retained therein at the pressure on receiver 62. However, for simplicity of presentation, the means for such additional treatment are omitted from the drawing.

The overhead fatty product from tower 56 is subjected to hydrolysis treatment in autoclave 26, in the manner described above, to effect conversion of glycerides contained therein to fatty acids. The glyceride in the fatty acid overhead product of this treatment is passed through line 10 to tower 1 for concentration of the fatty acids in the manner previously described in connection with this tower. The lower phase fraction obtained in tower 1 under these conditions will be relatively clean and may be recycled directly to autoclave 26 for further treatment, as through line 55. It may be desirable, however, to withdraw a small portion of the lower phase in tower 1 through line 13 to eliminate pitch-like products formed during hydrolysis. These by-products of hydrolysis may include compounds valuable in themselves and it may be advantageous to recover them in a highly concentrated form. Consequently, it may be desirable to withdraw from the bottom of tower 1 through line 13 only a small bottom fraction while recovering the glyceride concentrate as a side stream at 30, 44 or 45. Alternatively, all, or a portion of, the lower phase material formed in tower 1 in this operation may be passed to tower 56 in order to further purify this material prior to recycling it to autoclave 26. For this purpose line 72 is provided to connect line 13 with line 69. By means of pump 73 in line 72 all, or a portion of, the lower phase material from tower 1 is thus passed to tower 56 along with the fat charge to the system. By this means the pitch-like materials contained in the lower phase material in line 72 are eliminated from the system through line 70 along with the color bodies of the fat charge.

In accordance with an alternative method of operating with both tower 1 and tower 56 the fat charge may be passed directly through line 24 to the bottom of autoclave 26. The hydrolysis product is then concentrated in tower 1 and the lower phase material in tower 1 is passed through lines 72 and 69 to tower 56 and the preparation of a suitable stock for recycling to autoclave 26.

The methods of operation involving the simultaneous use of both tower 1 and tower 56 so far described require supplying two separate streams of propane. Since the use of two towers in that manner increases substantially the volume of propane required for the process it may be desirable to employ a modified operation in which one propane stream is made to serve both tower 1 and tower 56. This modified method of operation will be described particularly in connection with the use of tower 56 for the preliminary treatment of the fat charge, while tower 1 is employed to concentrate the fatty acid product and prepare a glyceride concentrate for recycling. In this method of operation the fat charge passes first to tower 56 through lines 24 and 69. Tower 56 is operated under conditions effective to separate a small bottoms fraction containing the color bodies which is withdrawn from the system through line 70. The overhead phase is withdrawn from tower 56 through line 61. Line 61 is connected to the lower part of precipitating vessel 46 by means of line 74. All, or a substantial part, of the overhead phase withdrawn from tower 56 through line 61 is passed through line 74 to precipitating vessel 46. In vessel 46 this overhead phase is heated to a higher temperature, in the manner previously described in connection with vessel 46. Vessel 46 advantageously is maintained at a higher pressure than tower 56 and for this purpose a pump 75 is provided in line 74 to assist in heating the overhead phase to a higher temperature. Additional heating means, 76, may be provided in line 74.

In vessel 46 the overhead phase passing therethrough is heated to a temperature sufficiently high to precipitate all, or most, of the fat contained therein, as a separate lower phase, which collects in the bottom of vessel 46. This material is withdrawn through line 50 for transfer to vessel 39 from which the fat passes to autoclave 26 in the manner previously described. The product of the autoclave is transferred to tower 1 through line 10, as described for the concentration of the fatty acid product in the upper phase withdrawn through line 12 from tower 1. For the treatment of the hydrolysis product the propane stream emerging from the top of vessel 46 through line 52 is passed to the bottom of tower 1. For this purpose line 77 is provided to conduct the propane phase passing through line 52 to the bottom of tower 1. This propane stream is cooled to a suitable temperature at 53 and thus provides the fractionating medium for the operation of tower 1. If necessary, this stream may be supplemented by a small amount of propane introduced into the bottom of tower 1 through line 7.

While it may be feasible to eliminate substantially all the fat in the propane stream introduced into the bottom of tower 1 in accordance with this method, by the heating treatment in vessel 46, it is ordinarily unnecessary and impractical to do so. Indeed, if the fat charge to the system already contains any substantial amount of fatty acids, it is desirable not to precipitate all of the fat in vessel 46, in order to pass directly to tower 1 the relatively concentrated fatty acid component left in the propane phase. Even if the fat charge to the system contains no fatty acid it may be desirable, in order to simplify the construction and operation of vessel 46, to pass to the bottom of tower 1 a propane phase containing a substantial proportion of glycerides. This places an extra burden on tower 1, which is relatively slight because of the great efficiency of tower 1 in separating between glycerides and fatty acids and because any glycerides introduced into tower 1 with the propane stream are introduced at the bottom of the tower near the exit for glycerides. It may be desirable, therefore, to operate vessel 46 to leave in the propane phase as much as 20% of the fat introduced through vessel 46 through line 74. Assuming a 50% split in autoclave 26 this would provide a fat charge to tower 1 containing at least 40% fatty acids. As we have seen such a mixture can be concentrated readily to an overhead free from glycerides and representing a high recovery of fatty acids.

In this manner a single propane stream is made to serve both tower 56 and tower 1. This stream passes from storage at 21 through lines 7 and 59 to the bottom of tower 56; from the top of tower 56 through lines 61 and 74 to vessel 46. From vessel 46 the stream passes through lines 52 and 77 to the bottom of tower 1. From the top of tower 1 the propane stream passes through lines 12 and 20 back to storage at 21. A part of the lower phase formed by precipitation in vessel 46 may be returned from line 50 through line 78 to the upper part of tower 56 as reflux. Alternatively a part of the overhead phase from tower 56 may be passed to vessel 62 to provide reflux in the manner described above. The liquid phase separated in vessel 62 is then returned through line 67 to the top of tower 56.

In accordance with an alternative method of operation the fat charge to the system first may be treated to separate therefrom a fraction concentrated in the unsaponifiable constituents of the fat charge. This preliminary treatment is particularly applicable to a fat charge containing little or no fatty acids. The unsaponifiables ordinarily are relatively more soluble in the propane than are the glycerides and thus, may be concentrated in a relatively small overhead fraction. In this modification the fat charge to the process may be passed directly, through lines 24 and 69 to tower 56. In tower 56 the fat charge is subjected to fractionation under refluxing conditions and with a relatively high top temperature to separate in the upper phase a relatively small proportion, e. g. 10% or less, of the fat charge. This fraction will contain a large proportion of unsaponifiable constituents of the fat charge. This concentrate of unsaponifiables is recovered from the propane phase at 62 and withdrawn from the system through line 65. The relatively large bottom fraction separated in tower 56 is passed through lines 70 and 79 to vessel 39 from which the fatty compound is passed to autoclave 26, in the manner described. The product of hydrolysis treatment from autoclave 26 passes through line 10 to tower 1 in which it is treated, in the manner described above, to separate overhead a fatty acid concentrate containing substantially no glycerides. Furthermore, by reason of the preliminary treatment in tower 56, this fatty acid concentrate will be substantially free from unsaponifiables. The glyceride concentrate for recycling to autoclave 26 may be recovered from tower 1 in any of the methods previously described and a small bottoms fraction containing the color bodies may be withdrawn from the system through line 13.

I claim:

1. A method for producing a fatty acid concentrate which comprises subjecting a fatty oil containing glycerides to hydrolysis treatment, regulating the conditions of hydrolysis to restrict conversion of glycerides to fatty acids to retain in the fatty oil hydrolysis product not substantially less than 25 per cent of glycerides, subjecting the fatty oil hydrolysis product to countercurrent solvent fractionation with a solvent having a critical temperature not substantially greater than 450° F. under paracritical conditions, regulating the temperature, pressure and reflux conditions of said fractionation to fractionate said fatty oil hydrolysis product into an extract containing fatty acids and substantially free from glycerides and a raffinate phase containing a minor proportion of said fatty oil hydrolysis product including the least soluble components thereof, separately withdrawing the extract and raffinate phases and withdrawing an intermediate fraction more concentrated in glycerides than said fatty oil hydrolysis product.

2. A method for producing a fatty acid concentrate which comprises subjecting a fatty oil mixture containing glycerides to solvent fractionation with a solvent having a critical temperature not substantially greater than 450° F. under paracritical conditions in an elongated countercurrent reflux fractionation zone to form oppositely flowing extract and raffinate phases, regulating the temperature, pressure and reflux conditions in said zone to form a primary extract phase containing a substantial proportion of glycerides and a primary raffinate phase containing a minor proportion of said fatty oil mixture including the least soluble components thereof; separately withdrawing the extract and raffinate phases; refractionating said primary extract phase to separate it into an intermediate lower fraction containing at least a major portion of the oil component thereof and an upper intermediate fraction of increased solvent power containing a major portion of the solvent component thereof; subjecting at least a portion of the oil in said lower intermediate fraction to hydrolysis treatment to effect conversion of a portion of the glycerides contained therein to fatty acids; recovering from said hydrolysis treatment a fatty oil mixture comprising glycerides and fatty acids; introducing said last-mentioned fatty oil mixture into a second countercurrent reflux fractionation zone; introducing said intermediate upper fraction into said second zone at a point substantially nearer the raffinate discharge of said second zone than the point of introduction of said last-mentioned fatty oil mixture and flowing in countercurrent contact therewith; regulating the temperature, pressure and reflux conditions of said second zone to form a final extract phase containing fatty acids and substantially free from glycerides; separately withdrawing the final extract phase and recovering the fatty acid concentrate therefrom; separately withdrawing from said second zone a second phase containing fatty oil more concentrated in glycerides than said fatty oil mixture recovered from said hydrolysis treatment; and recycling said glyceride concentrate to said hydrolysis treatment.

3. A method for producing a fatty acid concentrate from a fatty oil by hydrolysis of the glyceride content thereof and by fractionation of said oil under paracritical conditions with a solvent having a critical temperature not substantially greater than 450° F., which method includes the steps of: continuously contacting said oil with said solvent under paracritical conditions in a vertically extended fractionation zone to form an extract phase containing a major portion of said oil and a small raffinate phase containing color bodies and other components of low solubility; withdrawing said extract phase and subjecting at least a portion of the oil therein to hydrolysis to convert a portion of the glycerides therein to fatty acids; continuously contacting said hydrolyzed oil mixture with said solvent under paracritical conditions in a second vertically extended fractionation zone to fractionate said hydrolyzed oil into a secondary extract phase containing fatty acids and substantially free of glycerides; and a secondary raffinate phase containing glycerides; and recycling at least a portion of said secondary raffinate phase to said first fractionation zone.

4. A method for producing a fatty acid concentrate from a fatty oil by hydrolysis of the glyceride content thereof and by fractionation of said oil under paracritical conditions with a solvent having a critical temperature not substantially greater than 450° F., which method includes the steps of: continuously contacting said oil with said solvent under paracritical conditions in a vertically extended fractionation zone to form an extract phase containing a major portion of said oil and a small raffinate phase containing color bodies and other components of low solubility; withdrawing said extract phase and subjecting at least a portion of the oil therein to hydrolysis to convert a portion of the glycerides therein to fatty acids; continuously contacting said hydrolyzed oil mixture with said solvent under paracritical conditions in a second vertically extended fractionation zone to fractionate said hydrolyzed oil into a secondary extract phase containing fatty acids and substantially free of glycerides, and a secondary raffinate phase containing glycerides; and sending at least a part of the oil content of said secondary raffinate phase directly to said hydrolysis step.

5. A method as described in claim 3 in which said extract phase from said first fractionation zone is treated to reduce the solvent power of said solvent and precipitate at least a major portion of said extract oil into a lower phase; diverting said lower phase oil to said hydrolysis step and employing the remaining solvent phase as a solvent stream in said second fractionation zone.

6. A method for producing a fatty acid concentrate from a fatty oil by hydrolysis of the glyceride content thereof and by fractionation of said oil under paracritical conditions with a solvent having a critical temperature not substantially greater than 450° F., which method includes the steps of: continuously contacting said oil with a mixture comprised primarily of said solvent under paracritical conditions in a vertically extended fractionation zone to form an extract phase containing fatty acids and substantially free of glycerides, and a raffinate phase containing substantially all of the glyceride content of said oil; separately withdrawing said extract and raffinate phases and introducing said raffinate phase into a second vertically extended fractionation zone and contacting said raffinate phase therein with said solvent under paracritical conditions to form a small secondary raffinate containing color bodies and other least soluble components, and an extract phase containing glycerides; treating said extract phase to reduce the solvent power of said solvent and to precipitate a lower phase containing a major portion of the oil content; subjecting at least a portion of the oil in said lower phase to hydrolysis to convert a portion of the glycerides to fatty acids and recycling said hydrolyzed oil to said first fractionation zone; and employing the solvent phase remainder of said secondary extract phase as solvent in said first fractionation zone.

7. A method for producing a fatty acid concentrate from a fatty oil by hydrolysis of the glyceride content thereof and by fractionation of said oil under paracritical conditions with a solvent having a critical temperature not substantially greater than 450° F., which method includes the steps of: continuously contacting said oil with said solvent under paracritical conditions in a vertically extended fractionation zone to form an upflowing extract phase and a downflowing raffinate phase, flowing said phases in countercurrent relationship with one another to precipitate from said upflowing extract phase substantially all glycerides; withdrawing an extract phase substantially free from glycerides from the upper end of said vertically extended fractionation zone; withdrawing a raffinate phase containing a minor proportion of said fatty oil including the least soluble components thereof from the lower end of said vertically extended fractionation zone; withdrawing one of said counter-flowing fractions from an intermediate point of said vertically extended fractionation zone; subjecting at least a portion of the oil in said intermediate fraction to hydrolysis treatment to effect conversion of its glyceride content to fatty acids; and returning said hydrolyzed material to said vertically extended fractionation zone.

8. A method for producing a fatty acid concentrate from a fatty oil by hydrolysis of the glyceride content thereof and by fractionation of said oil under paracritical conditions with a solvent having a critical temperature not substantially greater than 450° F., which method includes the steps of: continuously contacting said oil with said solvent under paracritical conditions in a vertically extended fractionation zone to form an upflowing extract phase and a downflowing raffinate phase, flowing said phases in countercurrent relationship with one another, withdrawing an extract phase and a raffinate phase from said vertically extending fractionation zone, subjecting at least a portion of the oil content of one of said phases to hydrolysis treatment to convert a portion of the glycerides therein to fatty acids, and fractionating said hydrolyzed oil with said solvent under paracritical conditions to produce an extract phase containing fatty acids and substantially free of glycerides and recovering a fatty acid concentrate from said extract phase.

9. A method for producing a fatty acid concentrate from a fatty oil by hydrolysis of the glyceride content thereof and by fractionation of said oil under paracritical conditions with a solvent having a critical temperature not substantially greater than 450° F., which method includes the steps of: continuously contacting said oil with said solvent under paracritical conditions in a vertically extended fractionation zone to form an upflowing extract phase and a downflowing raffinate phase, flowing said phases in countercurrent relationship with one another, withdrawing an extract phase and a raffinate phase from said vertically extending fractionation zone, subjecting at least a portion of the oil content of one of said phases to hydrolysis treatment, regulating the conditions of hydrolysis to restrict conversion of glycerides to fatty acids to retain in the fatty oil hydrolysis product not substantially less than 25% of glycerides, subjecting the fatty oil hydrolysis product to countercurrent solvent fractionation with said solvent under paracritical conditions to fractionate said fatty oil hydrolysis product into a raffinate phase and an extract phase containing fatty acids and substantially free from glycerides and recovering a fatty acid concentrate from said extract phase.

10. A method for producing a fatty acid concentrate which comprises subjecting a fatty oil containing glycerides to hydrolysis treatment, regulating the conditions of hydrolysis to restrict conversion of glycerides to fatty acids to retain in the fatty oil hydrolysis product not substantially less than 25% of glycerides, subjecting the fatty oil hydrolysis product to countercurrent solvent fractionation in a vertically extended fractionation zone with a solvent having a critical temperature not substantially greater than 450° F. under paracritical conditions, regulating the temperature, pressure and reflux conditions of said fractionation to fractionate said fatty oil hydrolysis product into an extract containing fatty acids and substantially free from glycerides and a raffinate phase, separately withdrawing the extract and raffinate phases, recovering a fatty acid concentrate from said extract phase, passing at least a portion of said raffinate phase to a second vertically extended fractionation zone and contacting said raffinate phase therein with additional solvent to form a small secondary raffinate phase and a secondary extract phase more concentrated in glycerides than said fatty oil hydrolysis product.

11. A method for producing a fatty acid concentrate which comprises subjecting a fatty oil containing glycerides to solvent fractionation with a solvent having a critical temperature not substantially greater than 450° F. under paracritical conditions in an elongated countercurrent reflux fractionation zone to form oppositely flowing extract and raffinate phases, regulating the temperature, pressure and reflux conditions in said zone to form a primary extract phase containing a substantial proportion of glycerides and a primary raffinate phase containing a minor proportion of said fatty oil mixture including the least soluble components thereof; separately withdrawing the extract and raffinate phases; refractionating said primary extract phase to separate it into an intermediate lower fraction containing at least a major portion of the oil component thereof and an upper intermediate fraction of increased solvent power containing a major portion of the solvent component thereof; subjecting at least a portion of the oil in said lower intermediate fraction to hydrolysis treatment to effect conversion of a portion of the glycerides contained therein to fatty acids; recovering from said hydrolysis treatment a fatty oil mixture comprising glycerides and fatty acids; introducing said last-mentioned fatty oil mixture into a second countercurrent reflux fractionation zone; introducing said intermediate upper fraction into said second zone at a point substantially nearer the raffinate discharge of said second zone than the point of introduction of said last-mentioned fatty oil mixture and flowing in countercurrent contact therewith; regulating the temperature, pressure and reflux conditions of said second zone to form a final extract phase containing fatty acids and substantially free from glycerides; separately withdrawing the final extract phase and recovering the fatty acid concentrate therefrom; separately withdrawing from said second zone a second phase containing fatty oil more concentrated in glycerides than said fatty oil mixture recovered from said hydrolysis treatment.

12. A method for producing a fatty acid concentrate from a fatty oil by hydrolysis of the glyceride content thereof and by fractionation of said oil under paracritical conditions with a solvent having a critical temperature not substantially greater than 450° F., which method includes the steps of: continuously contacting said oil with said solvent under paracritical conditions in a vertically extended fractionation zone to form an upflowing extract phase and a downflowing raffinate phase, flowing said phases in countercurrent relationship with one another to separate in said extract phase only a relatively small proportion of the fatty oil charge, but containing a large proportion of the unsaponifiable constituents of said charge, withdrawing said small extract phase and a large raffinate phase and subjecting at least a portion of the oil in said raffinate phase to hydrolysis treatment to partially convert the glycerides therein to fatty acids, subjecting the fatty oil hydrolysis product to countercurrent solvent fractionation with said solvent under paracritical conditions in a second elongated countercurrent reflux fractionation zone to fractionate said fatty oil hydrolysis product into a secondary raffinate phase and a secondary extract phase containing fatty acids and substantially free from glycerides and recovering a fatty acid concentrate from said secondary extract phase.

13. A method for producing a fatty acid concentrate which comprises subjecting a fatty oil containing glycerides to hydrolysis treatment, regulating the conditions of hydrolysis to restrict conversion of glycerides to fatty acids to retain in the fatty oil hydrolysis product not substantially less than 25% of glycerides, subjecting the fatty oil hydrolysis product to countercurrent solvent fractionation in a vertically extended fractionation zone with a solvent having a critical temperature not substantially greater than 450° F. under paracritical conditions, regulating the temperature, pressure and reflux conditions of said fractionation to fractionate said fatty oil hydrolysis product into an extract containing fatty acids and substantially free from glycerides and a raffinate phase, separately withdrawing the extract and raffinate phases, recovering a fatty acid concentrate from said extract phase, passing at least a portion of said raffinate phase to a second vertically extended fractionation zone and contacting said raffinate phase therein with additional solvent to form a small secondary raffinate phase and a secondary extract phase containing glycerides, separating at least a portion of the oil content of said secondary extract phase and returning it to said hydrolysis treatment.

14. A method for producing a fatty acid concentrate which comprises subjecting a fatty oil mixture containing glycerides to solvent fractionation with a solvent having a critical temperature not substantially greater than 450° F. under paracritical conditions in an elongated countercurrent reflux fractionation zone to form oppositely flowing extract and raffinate phases, regulating the temperature, pressure and reflux conditions in said zone to form a primary extract phase containing a substantial proportion of glycerides and a primary raffinate phase containing a minor proportion of said fatty oil mixture, including the least soluble components thereof; separately withdrawing the extract and raffinate phases; treating said extract phase to reduce the solvent power of said solvent and to precipitate a lower oil phase containing at least a major portion of the oil component thereof and an upper solvent phase of increased solvent power containing a major portion of the solvent component thereof; subjecting at least a portion of the oil in said lower oil phase to hydrolysis treatment to effect conversion of a portion of the glycerides contained therein to fatty acids; recovering from said hydrolysis treatment a fatty oil mixture comprising glycerides and fatty acids; introducing said last-mentioned fatty oil mixture into a second countercurrent reflux fractionation zone; introducing said upper phase into said second zone at a point substantially nearer the raffinate discharge of said second zone than the point of introduction of said last-mentioned fatty oil mixture and flowing in countercurrent contact therewith; regulating the temperature, pressure and reflux conditions of said second zone to form a final extract phase containing fatty acids and substantially free from glycerides; separately withdrawing the final extract phase and recovering the fatty acid concentrate therefrom; separately withdrawing from said second zone a second phase containing fatty oil more concentrated in glycerides than said fatty oil mixture recovered from said hydrolysis treatment.

15. A process for treating a fatty oil containing glycerides and fatty acids which comprises introducing said oil at an intermediate point in a vertically extended countercurrent reflux fractionation zone, introducing to a lower portion of said zone a solvent having a critical temperature not substantially greater than 450° F., maintaining said zone under paracritical conditions to form oppositely flowing extract and raffinate phases, regulating the temperature, pressure and reflux conditions in said zone to form a raffinate phase containing color bodies and other components of low solubility and an extract phase containing fatty acids and glycerides, withdrawing a portion of said extract phase from a high point in said fractionation zone where the glyceride concentration is low and recovering a fatty acid product from said withdrawn extract phase, withdrawing a second portion of said extract phase from a low point in said fractionation zone where the glyceride concentration is high, treating said withdrawn second portion of said extract phase to reduce the solvent power of said solvent and to precipitate a lower oil phase containing at least a major portion of the oil component thereof and an upper solvent phase of increased solvent power containing a major portion of the solvent component thereof; subjecting at least a portion of the oil in said lower oil phase to hydrolysis and returning said upper solvent phase to a point in said fractionation zone below the point of introduction of said oil.

16. A method for producing a fatty acid concentrate which comprises subjecting a fatty oil containing glycerides to hydrolysis treatment to convert a portion of the glycerides to fatty acids, introducing the fatty oil hydrolysis product into a vertically elongated countercurrent reflux-fractionation zone at an intermediate point thereof, introducing into said zone at a point near the bottom thereof a solvent having a critical temperature not substantially greater than 450° F., flowing said solvent upwardly through said zone under paracritical conditions to form counter-flowing extract and raffinate phases, withdrawing a final extract phase from said zone at the top thereof and withdrawing a final raffinate phase from said zone at the bottom thereof, treating the extract phase flowing upwardly in said zone above the point of introduction of said fatty oil hydrolysis product to reduce the solvent power of said extract phase for less soluble components of the fatty oil mixture to form a lower raffinate phase which flows downwardly in said zone above said point of introduction, regulating the temperature, pressure and reflux conditions of said fractionation whereby the oil component of said final extract phase contains fatty acids and is substantially free from glycerides and said final raffinate phase contains a minor proportion of the less soluble components of said fatty oil, withdrawing from said zone an intermediate fraction more concentrated in glycerides than said fatty oil hydrolysis product and passing said intermediate fraction to said hydrolysis treatment.

17. The method of claim 16 wherein said intermediate fraction is a portion of said lower raffinate phase flowing downwardly in said zone.

18. The method of claim 16 wherein said intermediate fraction is a portion of the extract phase flowing upwardly in said zone.

19. The method of claim 16 wherein a charge oil containing color bodies and a minor proportion of fatty acids is introduced into said vertically elongated countercurrent reflux-fractionation zone at a point between the points of introduction of said fatty oil hydrolysis product and said solvent.

GEORGE H. PALMER.

References Cited in the file of this patent

UNITED STATES PATENTS

| Number | Name | Date |
|---|---|---|
| 2,118,454 | Schaafsma | May 24, 1938 |
| 2,329,889 | Ewing | Sept. 21, 1943 |

FOREIGN PATENTS

| Number | Country | Date |
|---|---|---|
| 402,651 | Great Britain | Dec. 7, 1933 |

OTHER REFERENCES

Bailey, "Industrial Oil and Fat Products," 1945, Interscience Publishers, Inc., N. Y., page 519.